United States Patent
Tsuboka (10) Patent No.: US 6,434,522 B1
(45) Date of Patent: Aug. 13, 2002

(54) COMBINED QUANTIZED AND CONTINUOUS FEATURE VECTOR HMM APPROACH TO SPEECH RECOGNITION

(76) Inventor: Eiichi Tsuboka, 6-24, Naritahigashi-machi, Neyagawa-shi, Osaka 572 (JP)

( * ) Notice: Subject to any disclaimer, the term of this patent is extended or adjusted under 35 U.S.C. 154(b) by 0 days.

(21) Appl. No.: 08/864,460

(22) Filed: May 28, 1997

Related U.S. Application Data (63) Continuation of application No. 08/076,192, filed on Jun. 14, 1993, now abandoned.

(30) Foreign Application Priority Data

Jun. 18, 1992 (JP) .............................. 4-159835

(51) Int. Cl.⁷ .............................................. G10L 15/14
(52) U.S. Cl. ........................ 704/256; 704/222; 704/245
(58) Field of Search ................................ 704/222, 242, 704/245, 256

(56) References Cited

U.S. PATENT DOCUMENTS

| | | | |
|---|---|---|---|
| 4,783,804 A | * 11/1988 | Juang et al. .................. 381/43 |
| 5,023,910 A | * 6/1991 | Thomson .................... 395/2.15 |
| 5,075,896 A | * 12/1991 | Wilcox et al. ................ 382/39 |
| 5,129,002 A | * 7/1992 | Tsuoka ........................ 381/43 |
| 5,289,562 A | * 2/1994 | Mizuta et al. ................. 395/2 |

FOREIGN PATENT DOCUMENTS

| JP | 0483296 | * 3/1992 | ............. G10L/3/00 |
|---|---|---|---|
| JP | 04-83296 | * 3/1992 | ............. G10L/3/00 |

OTHER PUBLICATIONS

J. N. Holmes, Speech Synthesis and Recognition, Chapman & Hall, p. 125, 142–143, 1988.*
Huang, X.D. Phoneme Classification Using Semicontinuous Hidden Markov Models, IEEE, Trans. on Signal Processing, 5/92, vol. 40, No. 5, pp. 1062–1067.*

* cited by examiner

Primary Examiner—Tãalivaldis Ivars Šmits (57) ABSTRACT

A device capable of achieving recognition at a high accuracy and with fewer calculations and which utilizes an HMM. The present device has a vector quantizing circuit generating a model by quantizing vectors of a training pattern having a vector series, and converting the vectors into a label series of clusters to which they belong, a continuous distribution probability density HMM generating circuit for generating a continuous distribution probability density HMM from a quantized vector series corresponding to each label of the label series, and a label incidence calculating circuit for calculating the incidence of the labels in each state from the training vectors classified in the same clusters and the continuous distribution probability density HMM.

13 Claims, 5 Drawing Sheets

COMBINED QUANTIZED AND CONTINUOUS FEATURE VECTOR HMM APPROACH TO SPEECH RECOGNITION

This is a continuation of application Ser. No. 08/076,192 filed on Jun. 14, 1993 abandoned.

BACKGROUND OF THE INVENTION

1. Field of the Invention

The present invention relates to an HMM generator, HMM memory device, likelihood calculating device and recognizing device for a novel HMM (Hidden Markov Model) that is applicable to such pattern recognitions as speech recognition.

2. Related Art of the Invention

Figure 1:
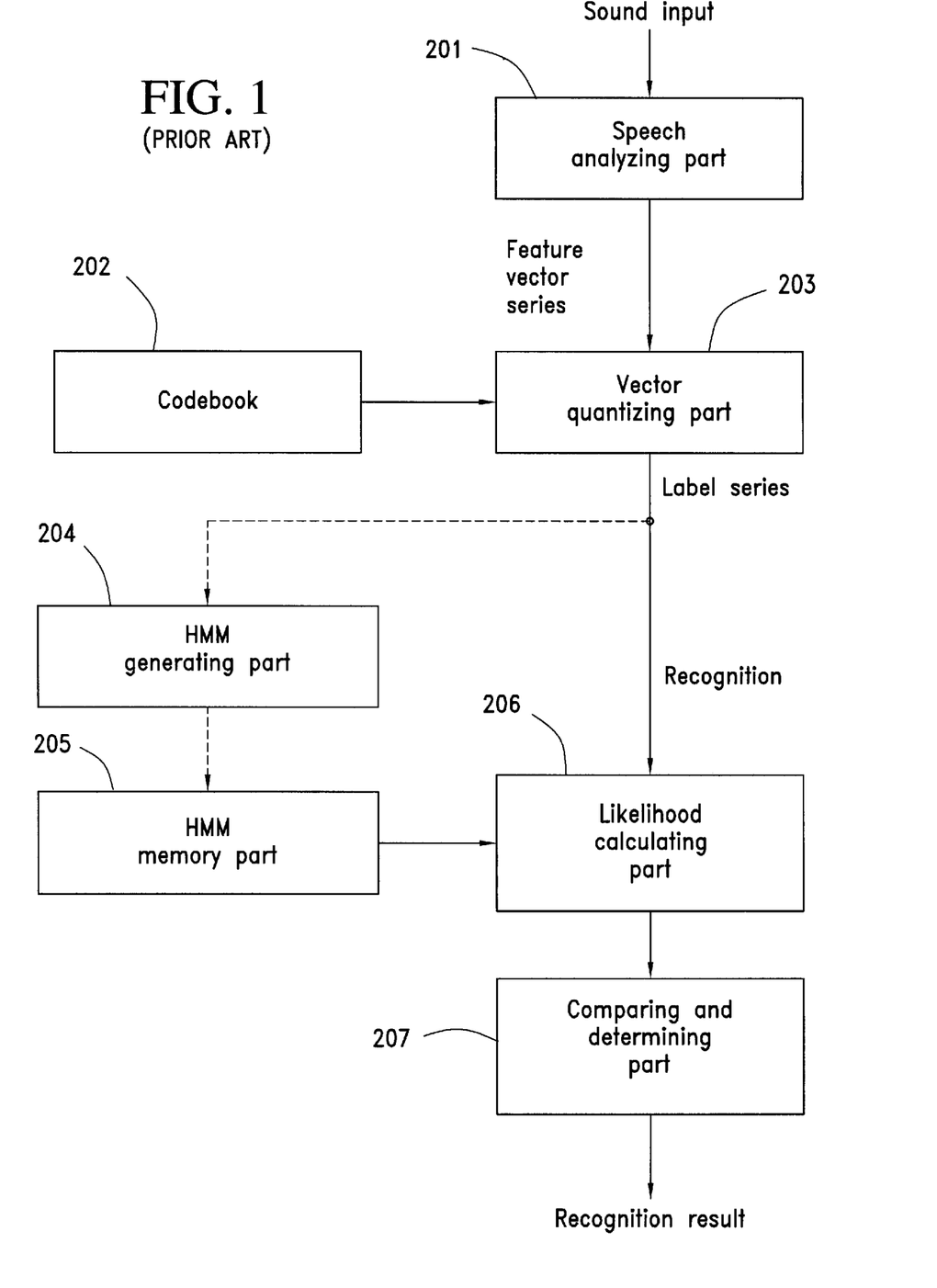
FIG. 1 is a block diagram explaining a speech recognizing device using HMM of the prior art.

Although an HMM is generally applicable to the time-series signal processing field, for convenience of explanation, it is described below in relation to, for example speech recognition. A speech recognizing device using HMM will be described first. FIG. 1 is a block diagram of a speech recognizing device using HMM. A speech analyzing part 201 converts input sound signals to feature vectors at a constant time interval (called a frame) of, for example, 10 msec, by means of a conventional method such as a filter bank, Fourier transformation and LPC analysis. Thus, the input signals are converted to a feature vector series Y=(y(1), y(2), ———, y(T)), where T is a number of frames. A codebook 202 holds labeled representative vectors. A vector quantizing part 203 substitutes labeled representative vectors corresponding to the closest presented vectors registered in the codebook 202 for respective vectors of the vector series Y. An HMM generating part 204 generates HMM corresponding to words that constitute a recognition vocabulary from training data. In other words, to generate HMM corresponding to a word v, an HMM structure (the number of states and transition rules applicable between the states) is firstly appropriately designated, and a state transition probability in the models and incidence probability of labels occurring in accordance with the state transition are developed from a label system obtained by a multiplicity of vocalizations of the word v such that the incidence probability of the label series is maximized. An HMM memory part 205 stores the HMM thus obtained for the words. A likelihood calculating part 206 calculates the likelihood of respective models stored in the HMM memory part 205 to the label series thereof. A comparison and determination part 207 determines, as a recognition result, words corresponding to models that provide the highest value of likelihood of the respective models.

More specifically, the recognition by HMM is performed in the following manner. When a label series O obtained for an unknown input is assumed to be O=(o(1), o(2), ———o(T)), a model λ corresponding to a word v, $\lambda^v$, a given state series of length. T generated by the model $\lambda^v$, is X=(x(1), x(2), ———, x(T)), the likelihood of $\lambda^v$ to the label series O is defined as:

[Exact Solution]

$$L_1(v) = \sum_x P(O, X | \lambda^v) \qquad \text{[formula 1]}$$

[Approximate Solution]

$$L_2(v) = \max_x [P(O, X | \lambda^v)] \qquad \text{[formula 2]}$$

or logarithmically as:

$$L_3(v) = \max_x [\log P(O, X | \lambda^v)] \qquad \text{[formula 3]}$$

where $P(x,y|\lambda^v)$ is a joint occurrence probability of x, y in model $\lambda^v$.

Therefore, in the following expression using formula 1, for example;

$$v^\wedge = \operatorname*{argmax}_v [L_1(v)] \qquad \text{[formula 4]}$$

$V^\wedge$ is a recognition result. Formulae 2 and 3 can be used in the same manner.

$P(O, X|\lambda)$ can be obtained in the following manner.

When an incidence $b_i(o)$ of label o and a transition probability $a_{ij}$ from a state $q_i$ (i=1~I) to state $q_j$ (j=1~I+1) are given by state $q_i$ for $q_i$ (i=1~I) of HMM, a simultaneous probability of coincidence of state series X=(x(1), x(2), ———,s(T)) and label series O=(o(1), o(2), ———,o(T)) from HMM λ is defined as:

$$P(O, X | \lambda) = \pi_{x(1)} \prod_{t=1}^{T} a_{x(t)x(t+1)} \prod_{t=1}^{T} b_{x(t)}(o(t)) \qquad \text{[formula 5]}$$

where $\pi_{x(1)}$ is an initial probability of state x(1). Incidentally, x(T+1)=I+1 is a final state, and it is assured that no label is generated there.

In the example, although an input feature vector y is converted to a label, the feature vector y can be directly used alternatively for the incidence probability of vector y in each state, and in this case the probability density function of vector y can be given for each state. In this case, a probability density $b_i(y)$ of the feature vector y is used in place of the incidence probability $b_i(o)$ of the label o in the state $q_i$(hereinafter), when z is assumed to be a label, $b_i(z)$ defines a probability generated with z in a state of i, and, when z is assumed to be a vector, and $b_i(z)$ defines a probability density of z. In this case, the formulae 1, 2 and 3 are expressed as:

[Exact Solution]

$$L'_1(v) = \sum_x P(Y, X | \lambda^v) \qquad \text{[formula 6]}$$

[Approximate Solution]

$$L'_2(v) = \max_x [P(Y, X | \lambda^v)] \qquad \text{[formula 7]}$$

or logarithmically as;

$$L'_3(v) = \max_x [\log P(Y, X | \lambda^v)] \qquad \text{[formula 8]}$$

Thus, in any of the methods, when HMM $\lambda^v$ is prepared for each word v, where v=1~V, a final recognition result for an input sound signal, Y is:

$$\hat{v} = \underset{v}{\mathrm{argmax}}[P(Y \mid \lambda^v)] \qquad \text{[formula 9]}$$

or $$\hat{v} = \underset{v}{\mathrm{argmax}}[\log P(Y \mid \lambda^v)] \qquad \text{[formula 10]}$$

where Y is, of course, an input label series, feature vectorial series and the like according to the respective methods.

In such conventional examples, a method of converting input feature vectors to labels is hereinafter referred to as a discrete probability distribution HMM, and another method of using input feature vectors as they are as a continuous probability distribution HMM. Features of these are described below.

It is an advantage of the discrete probability distribution HMM that the number of calculations is fewer when calculating likelihood of a model to an input label series, because the incidence probability $b_i(C_m)$ of a label in state i can be run by reading from a memory device which prestores the incidence probabilities in relation to the labels, but recognition accuracy is inferior and therefore creates a problem due to errors associated with quantization. In order to prevent this problem, it is necessary to increase the number of labels(the number of clusters) although the number of learning patterns required for learning the models accordingly becomes significant. If the number of learning patterns is insufficient, $b_i(C_m)$ may frequently be 0, and correct estimation cannot be obtained. For example, the following case may occur.

In the preparation of a codebook, speeches vocalized by multiple speakers are converted to a feature vector series for all words to be recognized, the set of feature vectors are clustered, and the clusters are respectively labeled. Each of the clusters has its representative vector called a centroid, which is generally an expected value of the vectors classified to the clusters. A codebook is defined as the centroids stored in a form retrievable by the labels.

Now, it is assumed that a word "Osaka", for example, is present in the recognition vocabulary, and a model corresponding to it is prepared. Voice samples corresponding to the word "Osaka" that are vocalized by multiple speakers are converted to a feature vector series, each of the feature vectors is compared with the centroid, and the label corresponding closest to the centroid is choosen as the Vector Quantized value of the feature vector. In this way, the voice samples corresponding to the word "Osaka" are converted to a label series. By estimating an HMM parameter from the resultant label series in such a manner that the likelihood to the label series is maximized, a model corresponding to the word "Osaka" is obtained. For the estimation, a method known as the Baum-Welch algorithm can be used.

In this case, some of the labels in the codebook might not be included in the learning label series corresponding to the word "Osaka". The incidence probability of such labels that are not included therein is assumed to be "0" during the learning process. Therefore, it is very likely that labels not included in the label series used for modeling of the word "Osaka" may be present in a label series to which vocalization of the word "Osaka" is converted in recognition. In such a case, the incidence probability of a label series of the word "Osaka" vocalized in recognition from the model of the word "Osaka" comes to be "0". Even in such a case, however, sometimes a vocalization is different in the label state, but relatively close to a voice sample used in model learning in the feature vector state before it is converted to a label, and sufficient to be recognized as "Osaka" in terms of the vectorial state. Such a problem is possibly caused, even if it is similar at the vectorial level, since even though originally the same word is vocalized, it can be converted, at the labeling level, to an absolutely different label because of a slight difference, and it is easily predicted that this adversely affects recognition accuracy. As the number of clusters is increased, and the number of training data is decreased, such a problem is more frequently caused.

In order to eliminate such a problem, smoothing and interpolation is required for labels that are not shown (included) in a training set. Although various methods are suggested for the smoothing and interpolation as a means of reducing the number of parameters by using a concept called "tied states", and methods of substituting for a probability, if it is estimated to be 0, a small amount without estimating it as being 0, and equivocating boundaries of clusters such as fuzzy vector quantization, none of them can fundamentally solve the problem. In addition, there are such elements that must be empirically determined for particular cases, and no theoretical guideline for the determination of such elements is suggested.

On the other hand, in the continuous probability distribution HMM, a distribution profile for each state is given beforehand in the form of a function such as a normal distribution, and parameters defining the function are estimated from the learning data. Therefore, the number of parameters to be estimated is fewer, a parameter can be estimated accurately through learning patterns fewer than those of the discrete type, smoothing and interpolation are eliminated, and it is reported that a recognition ratio higher than that of the discrete type is generally obtained.

Figure 4:
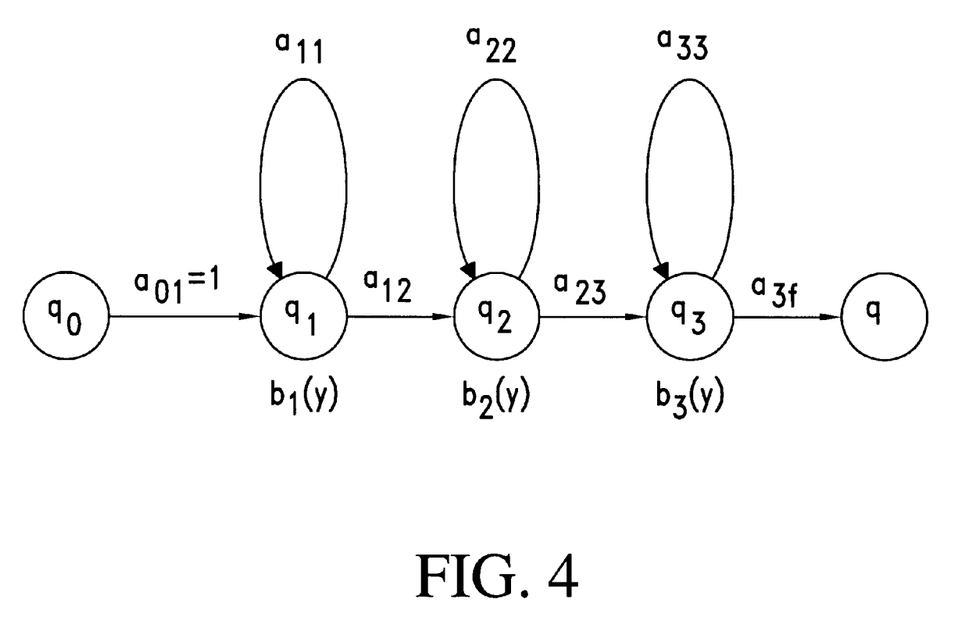
FIG. 4 is a structural diagram of an HMM showing a structure of a continuous probability distribution type HMM.

For examples, when the number of parameters is compared between the discrete and continuous types in HMM of a 4 state and 3 loop arrangement as shown, for example in FIG. 4, the following result is recognized. In the case of a discrete type, if 256 types of labels are used, 256×3=768 for incidence probability of labels and 6 for transition probability result. Thus, 774 in total are required for one model. In the case of a continuous type, if it is a 10 dimensional normal distribution, 10×3=30 for an average vector, 55×3=165 for a variance-covariance matrix (because of symmetric matrix) and 6 for a transition probability result. Thus a total of 201 are required, and therefore the number of parameters to be estimated is approximately ¼ or less in the continuous type compared with the discrete type.

However, the fact that the number of calculations is significantly increased in the continuous type in comparison with the discrete type, although the continuous type is superior in recognition accuracy a problem is still created. In other words, if an input feature vector y(t) has an average vector $\mu_i$ in the state i and a normal distribution of a variance-covariance matrix $\Sigma_i$ for calculating incidence probability (density) of y(t) in state i, a calculation of $(y(t)-\mu_i)^T \Sigma_i^{-1}(y(1)-\mu_i)$ is required. Thus, in the case of a 10 dimensional HMM continuous type, for example, only 110 multiplications are required for this calculation, and it is multiplied by (the number of states times the number of input frames) for one model. Therefore, when the number of input frames of the model is estimated to be 50, the number of multiplications required in the calculation of $(y(t)-\mu_i)^T \Sigma_i^{-1}(y(1)-\mu_i)$ is 110×3×50=16500. Then, if the number of words is 500, it is multiplied by 500. That means that 8,250,000 multiplications are required solely for this portion.

In the case of the discrete type, after calculations for quantizing vectors are completed, it is only required to read an incidence probability of the label from the memory device according to the label as described. In the above example, calculations required for vector quantization of y(t) are those of distance or similarity between 256 representative vectors and y(t). If the distance is (Euclidean distance)$^2$, the calculations required for the labeling of y(t) are 256 times 10 subtractions, 10 multiplications and 10 additions. Therefore, in the case of 50 frames, for multiplication only, 10×256×50=128000 calculations should be performed. If the vector quantization is performed according to a method called binary search, the figure 256 is replaced by 2 log$_2$256=16, and the number of calculations comes to 10×16×50=8000.

Accordingly, the number of calculations is remarkably reduced by the discrete type, and the number of calculations is increased proportionally as the number of recognition words is increased in the continuous type, such calculations are required only once for vector quantization of input sound signals in the discrete type, and the number of calculations is unchanged even when the recognition words are increased.

In summary, the discrete type has a problem in recognition accuracy, although the number of calculations is fewer, while the continuous type has a problem in the number of calculations, though the recognition accuracy is superior.

SUMMARY OF THE INVENTION

Hence, in the light of such problems in conventional HMM, it is an object of the present invention to provide an HMM generator, HMM memory device, likelihood calculating device and recognizing device capable of providing superior recognition accuracy and reducing the number of calculations.

An HMM generator of the present invention comprises:
vector quantizing means for quantizing vectors of a training pattern having a vectorial series, and converting the vectors into a label series of clusters to which they belong,
continuous distribution probability density HMM generating means for generating a continuous distribution probability density HMM from a quantized vector series corresponding to each label of the label series, and
label incidence calculating means for calculating incidence of the labels in each state from the training vectors classified in the same clusters and the continuous distribution probability density HMM.

A likelihood calculating device of the present invention comprises:
the above mentioned vector quantizing means for converting the vector series to a label series by substituting labels for vectors of a feature vector series that constitutes an input pattern, and
likelihood calculating means for calculating, from a state transition probability and label incidence stored in the HMM memory device likelihood of HMM described by parameters stored in the HMM memory device to the input pattern.

In an HMM generator according to the present invention, vector quantizing means quantizes vectors of a training pattern having a vector series, and converts the vectors to a label series of clusters to which they belong, continuous distribution probability density HMM generating means generates a continuous distribution probability density HMM from a quantized vector series corresponding to each label of the label series, and incidence of a label in each state is calculated from the training vectors classified in the same clusters and the continuous distribution probability density HMM.

Additionally, in a likelihood calculating device according to the present invention, a vector series is converted to a label series by substituting labels for vectors of a feature vector series constituting a pattern by an input of a vector quantizing means, and the likelihood of the HMM to an input pattern is calculated from label incidence in each state of the HMM generated by the HMM generator.

PREFERRED EMBODIMENT OF THE INVENTION

An embodiment of the present invention is described below by referring to the drawings.

The definition of the symbols used hereinbelow are first described. For simplicity, states $q_i$, $q_j$ and the like are indicated simply as i, j and the like to avoid misunderstanding. As for a model learning, it is described for a word v, and a subscript v is gadded, when identification is required, in the upper right portion of a parameter, but omitted in general circumstances. The symbols are described below.

i=1, 2, . . . , I+1: State number i
[$a_{ij}$]: Transition matrix
$a_{ij}$: Transition probability from state i to state j
r: Training pattern number (r=1, . . . , R) to word v
$y^{(r)}(t)$: Observation vector in the frame number t of the training pattern r
$o^{(r)}(t)$: Observation label in the frame number t of the training pattern
$b_i(y^{(r)}(t))$: Probability density in the state i of the vector $y^{(r)}(t)$ of the frame t of the training pattern r
$b_i(o^{(r)}(t))$: Incidence (probability, probability density etc.) in the state i of the observation label $o^{(r)}(t)$ of the frame t of the training pattern
$y^{(r)}=(y^{(r)}(1), y^{(r)}(2), \ldots, y^{(r)}(T^{(r)}))$: Vector series of the training pattern r (where r=1, 2, . . . , R)
$O^{(r)}=(o^{(r)}(1), o^{(r)}(2), \ldots, o^{(r)}(T^{(r)}))$: r-th Label series to word v (where r=1, 2, . . . , R)
$X^{(r)}=(x^{(r)}(1), x^{(r)}(2), \ldots, x^{(r)}(T^{(r)}), X^{(r)}(T^{(r)}+1))$: State series corresponding to $X^{(r)}$ or $O^{(r)}$
$X^{(r)}(t)$: State of r-th training pattern in the frame number t to the word v
$T^{(r)}$: The number of frames of r-th training pattern to the word v
$\mu_i$: Average vector of $b_i(y)$
$\Sigma_i$: Variance-covariance matrix of $b_i(y)$
$\xi_i$: Set of parameters ($\xi_i=\{\mu_i, \Sigma_i\}$) defining a probability distribution of the observation vector in the state i $\lambda_i = [\xi_i, \{a_{ij}\}_{j=i, \underline{\qquad}, I+1}]$: Set of parameters in the state i
$\lambda = \{\lambda_i\}$: Set of all parameters (a model having parameter $\lambda$ is also referred to as "model $\lambda$")
$P(Y|\lambda)$: Probability density of the observation vector series Y occurring from the model $\lambda$
$P(O|\lambda)$: Probability of observation label series O occurring from the model $\lambda$
$\pi_i$: Probability of the state i at t=1

First of all, a method of learning the continuous probability distribution HMM for word v is described. It is an issue to estimate a parameter $\lambda$ that maximizes a likelihood function $P(Y^{(1)}, Y^{(2)}, \underline{\qquad}, Y^{(R)}|\lambda)$ to a training pattern of r=1~R prepared for a word v.

If $Y^{(r)}$ is mutually independent, it is given by;

$$P(Y^{(1)}, Y^{(2)}, \cdots, Y^{(R)} | \lambda) = \prod_{r=1}^{R} P(Y^{(r)} | \lambda)$$ [formula 11]

$$= \prod_{r=1}^{R} \left\{ \sum_{x^{(r)}} P(Y^{(r)}, X^{(r)} | \lambda) \right\}$$

$$= \sum_{x^{(1)}} \cdots \sum_{x^{(R)}} \prod_{k=1}^{R} P(Y^{(k)}, X^{(k)} | \lambda)$$

Here, an auxiliary function $Q(\lambda, \lambda')$ is defined.

$$Q(\lambda, \lambda') = \sum_{x^{(1)}} \cdots \sum_{x^{(R)}} \left[ \prod_{k=1}^{R} P(Y^{(k)}, X^{(k)} | \lambda) \right] \times \log \left[ \prod_{k=1}^{R} P(Y^{(k)}, X^{(k)} | \lambda') \right]$$ [formula 12]

For this, the following relation is obtained. If $Q(\lambda, \lambda') \geq Q(\lambda, \lambda)$, $P(Y^{(1)}, \underline{\qquad}, Y^{(R)}|\lambda') \geq P(Y^{(1)}, \underline{\qquad}, Y^{(R)}|\lambda)$ and equality is attained when $\lambda' = \lambda$.

$$\lambda^* = \underset{\lambda'}{\operatorname{argmax}}[Q(\lambda, \lambda')]$$ [formula 13]

Therefore, if formula 13 is obtained, by repeatedly applying the formula 13 with $\lambda^* \to \lambda$, $\lambda$ converges at a stationary point of $P(Y^{(1)}, \underline{\qquad}, Y^{(R)}|\lambda)$, that is, a point giving the maximum value or saddle point of $P(Y^{(1)}, \underline{\qquad}, Y^{(R)}|\lambda)$, and then a local optimum solution can be obtained by repeating the operation until the rate of change of $P(Y^{(1)}, \underline{\qquad}, Y^{(R)}|\lambda)$ comes to be equal to or less than a predetermined threshold value.

Succeedingly, a method of estimating a parameter by using $Q(\lambda, \lambda')$ is described.

By transforming the formula 12, the following formula is obtained.

$$Q(\lambda, \lambda') = P(Y^{(1)}, \cdots, Y^{(R)} | \lambda) \sum_{r=1}^{R} \frac{1}{P(Y^{(r)} | \lambda)} \times \sum_{x^{(r)}} P(Y^{(r)}, X^{(r)} | \lambda) \log P(Y^{(r)}, X^{(r)} | \lambda')$$ [formula 14]

From the above description, if $\lambda'$ that provides $Q(\lambda, \lambda') > Q(\lambda, \lambda)$ is found by estimating that $Q(\lambda, \lambda')$ is a function of $\lambda'$, as it is an update of $\lambda$, and $P(Y^{(1)}, \underline{\qquad}, Y^{(R)}|\lambda)$ is a constant value for $\lambda'$, and therefore when it is removed as;

$$Q'(\lambda, \lambda') = Q(\lambda, \lambda') / P(Y^{(1)}, \cdots, Y^{(R)} | \lambda)$$ [formula 30]

$$= \sum_{r=1}^{R} c^{(r)} \sum_{x^{(r)}} P(Y^{(r)}, X^{(r)} | \lambda) \log P(Y^{(r)}, X^{(r)} | \lambda')$$

it corresponds to finding $\lambda'$ that provides $Q(\lambda, \lambda') > Q(\lambda, \lambda)$.

Here, however, it is estimated that;

$$\xi_{ij}^{(r)}(t) = P(Y^{(r)}, x^{(r)}(t-1) = i, x^{(r)}(t) = j | \lambda)$$ [formula 15]

$$\gamma_i^{(r)} = (t) = P(Y^{(r)}, x^{(r)}(t) = i | \lambda) = \sum_{j=1}^{i+1} \xi_{ij}^{(r)}(t)$$

$$c^{(r)} = 1 / P(Y^{(r)} | \lambda) = 1 \bigg/ \sum_{i=1}^{I} \gamma_i^{(r)}(t)$$

The formula 14 can be further transformed as;

$$Q'(\lambda, \lambda') = \sum_{r=1}^{R} c^{(r)} \sum_{x^{(r)}} P(Y^{(r)}, X^{(r)} | \lambda) \times$$ [formula 16]

$$\left\{ \log \pi'_{x^{(r)}(1)} + \sum_t \log a'_{x^{(r)}(t)x^{(r)}(t+1)} + \sum_t \log b_{x(t)}(y^{(r)}(t))' \right\}$$

$$= \sum_{r=1}^{R} c^{(r)} \sum_i P(Y^{(r)}, x^{(r)}(1) = q_i | \lambda) \log_i' +$$

$$\sum_{r=1}^{R} c^{(r)} \sum_t \sum_i \sum_j P(Y^{(r)}, x^{(r)}(t) = q_i,$$

$$x^{(r)}(t+1) = q_j | \lambda) \log a'_{ij} +$$

$$\sum_{r=1}^{R} c^{(r)} \sum_t \sum_i P(Y^{(r)},$$

$$x^{(r)}(t) = q_i | \lambda) \log b_i(y^{(r)}(t))'$$

$x^{(r)}(t) = q_i | \lambda) \log b_i (y^{(r)}(t))'$

When it is maximized for $\pi_i'$ from the first term on the right side, a re-estimated value $\pi_i^*$ of $\pi_i$ is;

$$\pi_i^* = \sum_{r=1}^{R} c^{(r)} \gamma_i(1).$$ [formula 17]

When it is maximized for $a_{ij}'$ from the second term on the right side, a re-estimated value $a_{ij}^*$ of $a_{ij}$ is;

$$a_{ij}^* = \frac{\sum_{r=1}^{R} c^{(r)} \sum_{t=1}^{T^{(r)}} \xi_{ij}^{(r)}(t)}{\sum_{r=1}^{R} c^{(r)} \sum_{t=1}^{T^{(r)}} \sum_{j=1}^{J+1} \xi_{ij}^{(r)}(t)}.$$ [formula 18]

When it is maximized for $\mu_i'$ and $\Sigma_i'$ from the third term on the right side, re-estimated values $\mu_i^*$ and $\Sigma_i^*$ of $\mu_i$ and $\Sigma_i$, respectively, are;

$$\mu_i^* = \frac{\sum_{r=1}^{R} c^{(r)} \sum_{t=1}^{T^{(r)}} \gamma_i^{(r)}(t) y^{(r)}(t)}{\sum_{r=1}^{R} c^{(r)} \sum_{t=1}^{T^{(r)}} \gamma_i^{(r)}(t)},$$ [formula 19]

$$\Sigma_i^* = \frac{\sum_{r=1}^{R} c^{(r)} \sum_{t=1}^{T^{(r)}} \gamma_i^{(r)}(t)(y^{(r)}(t) - \mu_i)(y^{(r)}(t) - \mu_i)^T}{\sum_{r=1}^{R} c^{(r)} \sum_{t=1}^{T^{(r)}} \gamma_i^{(r)}(t)}.$$ [formula 20]

Here, $\xi^{(r)}_{ij}(t)$ can be calculated as follows. That is, if such conditions as;

$$\left. \begin{array}{l} \alpha_i^{(r)}(t) = P(y^{(r)}(1), \cdots, y^{(r)}(t), x^{(r)}(t) = i \mid \lambda) \\ \beta_i^{(r)}(t) = P(y^{(r)}(t+1), \cdots, y^{(r)}(T) \mid x^{(r)}(t) = i, \lambda) \end{array} \right]$$ [formula 21]

are estimated;

$$\xi_{ij}^{(r)}(t) = P(Y^{(r)}, x^{(r)}(t-1) = i, x^{(r)}(t) = j \mid \lambda)$$ [formula 22]
$$= \alpha_i^{(r)}(t-1) a_{ij} b_j(y^{(r)}(t)) \beta_j^{(r)}(t)$$

$$\gamma_i^{(r)}(t) = \alpha_i^{(r)}(t) \beta_i^{(r)}(t)$$

Thus, the following recurrence formulae are obtained.

$$\alpha_i^{(r)}(t) = \sum_i \alpha_i^{(r)}(t-1) a_{ij} b_j(y^{(r)}(t))$$ [formula 23]

$$\beta_i^{(r)}(t) = \sum_j b_j(y^{(r)}(t)) a_{ij} \beta_j^{(r)}(t)$$ [formula 24]

Therefore, by giving an appropriate initial value to $\lambda$ estimating $\alpha^{(r)}_1(1)=1$, and successively calculating $\alpha^{(r)}j(t)$ for $t=1\sim T^{(r)}+1$, $j=1\sim I+1$ according to the formula 23, and $\beta^{(r)}_i(t)$ for $t=T^{(r)}+1\sim 1$, $i=I\sim 1$ according to the formula 24 by estimating $\beta^{(r)}_{I+1}(T^{(r)}+1)=1$, the formula 15 can be calculated.

The actual procedure for estimating a parameter comprises the steps of:
(1) $L_1=\infty$
(2) giving an appropriate initial value to $\lambda_i\{(a_{ij})_{j=1}, \text{———}, {}_{I+1}, \mu_i, \Sigma_i\}$ for i, j=1~I;
(3) calculating $\alpha^{(r)}_i(t)$ for r=1~R, t=2~T$^{(r)}$, i=1~I+1 according to the formula 23 by estimating $\lambda=\{\lambda_i\}$;
(4) calculating $\beta^{(r)}_i(t)$ and $\xi^{(r)}_{ij}(t)$ for r=1~R, t=2~T$^{(r)}$, i=1~I+1 according to the formulae 24 and 22, respectively, by estimating $\lambda=\{\lambda_i\}$;
(5) calculating for r=1~R, i, j=1~+1;
  numerator: $a_{ij,num}(r)$, $\mu_{i,num}(r)$, $\Sigma_{i,num}(r)$; and
  denominator: $\text{Den}_i(r)=a_{ij,denom}(r)=\mu_{i,denom}(r)=\Sigma_{i,denom}(r)$
  of the formulae 18, 19 and 20;
(6) calculating re-estimated values $a_{ij}^*$, $\mu_i^*$ and $\Sigma_i^*$ of $a_{ij}$, $\mu_i$ and $\Sigma_i$ according to the following formulae:

$$a_{ij}^* = \sum_r c^{(r)} a_{ij,num}(r) \bigg/ \sum_r c^{(r)} \text{Den}_i(r),$$ [formula 25]

$$\mu_i^* = \sum_r \mu_{i,num}(r) \bigg/ \sum_r c^{(r)} \text{Den}_i(r),$$

$$\Sigma_i^* = \sum_r c^{(r)} \Sigma_{i,num}(r) \bigg/ \sum_r c^{(r)} \text{Den}_i(r)$$

(7) by substitutions of $a_{ij}=a_{ij}^*$, $\mu_i=\mu_i^*$ and $\Sigma_i=\Sigma_i^*$ for i,j= 1~I+1, obtaining a set of re-estimated parameters $\lambda=\{\lambda_i\}$;
(8) calculating for the set of parameters $\lambda$ for r=1~R, t=2~T$^{(r)}$, i=1~I+1 obtained in step (7);

$$L_2 = \sum_{r=1}^{R} P(Y^{(r)} \mid \lambda) = \sum_{r=1}^{R} \alpha_{T^{(r)}+1}^{(r)}(I+1)$$ [formula 26]

and
(9) if $|L_1-L_2|/L_1 > \epsilon$, then putting $L_2=L_1$ and going to step (4), or otherwise terminating the procedure.

$\epsilon$ in the step (9) is an appropriately small positive number that determines a width of convergence, and a practical value is selected for it according to the particular situation.

In such a manner, a continuous probability distribution HMM is obtained. Based on this, the present invention provides a discrete probability distribution HMM by a procedure comprising the following steps.
(1) By clustering learning vectors, M clusters are calculated; The clusters are referred to as $C_1$, $C_2$, ———, $C_m$, $C_M$. A centroid of the cluster $C_m$ is referred to as $y_{mo}$.
(2) A vector series $y^{(r)}(1)$, $y^{(r)}(2)$ ———, $y^{(r)}(T^{(r)})$ of training pattern is converted to a centroid series $z^{(r)}(1)$, $z^{(r)}(2)$, ———, $z^{(r)}(T^{(r)})$; and
(3) By estimating that the centroid series of step (2) is a set of learning patterns, using the continuous type HMM is obtained and, an incidence of $C_m$ (m=1, . . . , M) in each state of the HMM is determined using the continuous type HMM.

Here, a variety of methods can be considered for defining the incidence of labels. In other words, (a) an incidence probability density of the centroid of $C_m$ in state i, (b) the mean value or median of the probability density of the learning vectors classified in $C_m$, and (c) normalization in (a) and (b) so that their sum for the clusters is 1. In the case of (b) the mean can be an arithmetic mean, a geometric mean, or a harmonic mean. Here, as an embodiment of the present invention, the method (b) using an arithmetic mean and without normalization is described: $b_i(y)$ used in a formula below is obtained from an estimated parameter of the continuous type HMM. In this case, an incidence $b_{im}$ of the cluster $C_m$ in the state i is given by:

$$b_{im} = \frac{1}{K^m} \sum_{k=1}^{K^m} b_i(y_m(k))$$ [formula 27]

wherein:
  $K^m$ is the total number of the feature vectors belonging to the cluster $C_m$; and
  $Y_m(k)$ is the k-th feature vector among the feature vectors belonging to the cluster $C_m$.

For the clustering method noted in step (1) above, such a known method can be used, for example, the known LBG method (not described in detail here). As data to be clustered, an entire set of feature vectors constituting a pattern that corresponds to a vocalized word v=1~V used in learning of the HMM can be used.

Figure 2:
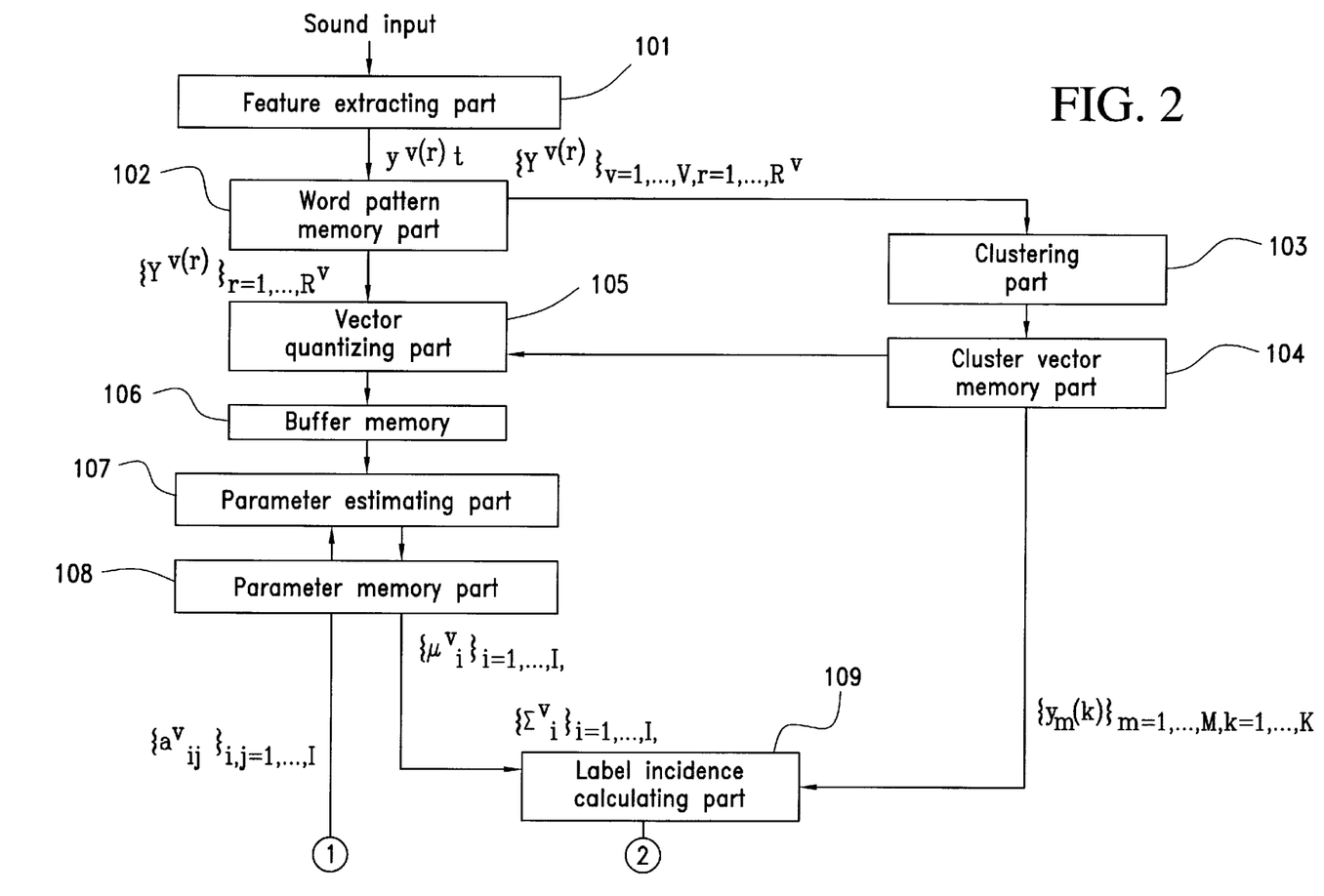
FIG. 2 is a part of a block diagram showing an embodiment of a device for estimating a parameter of HMM according to the present invention.
Figure 3:
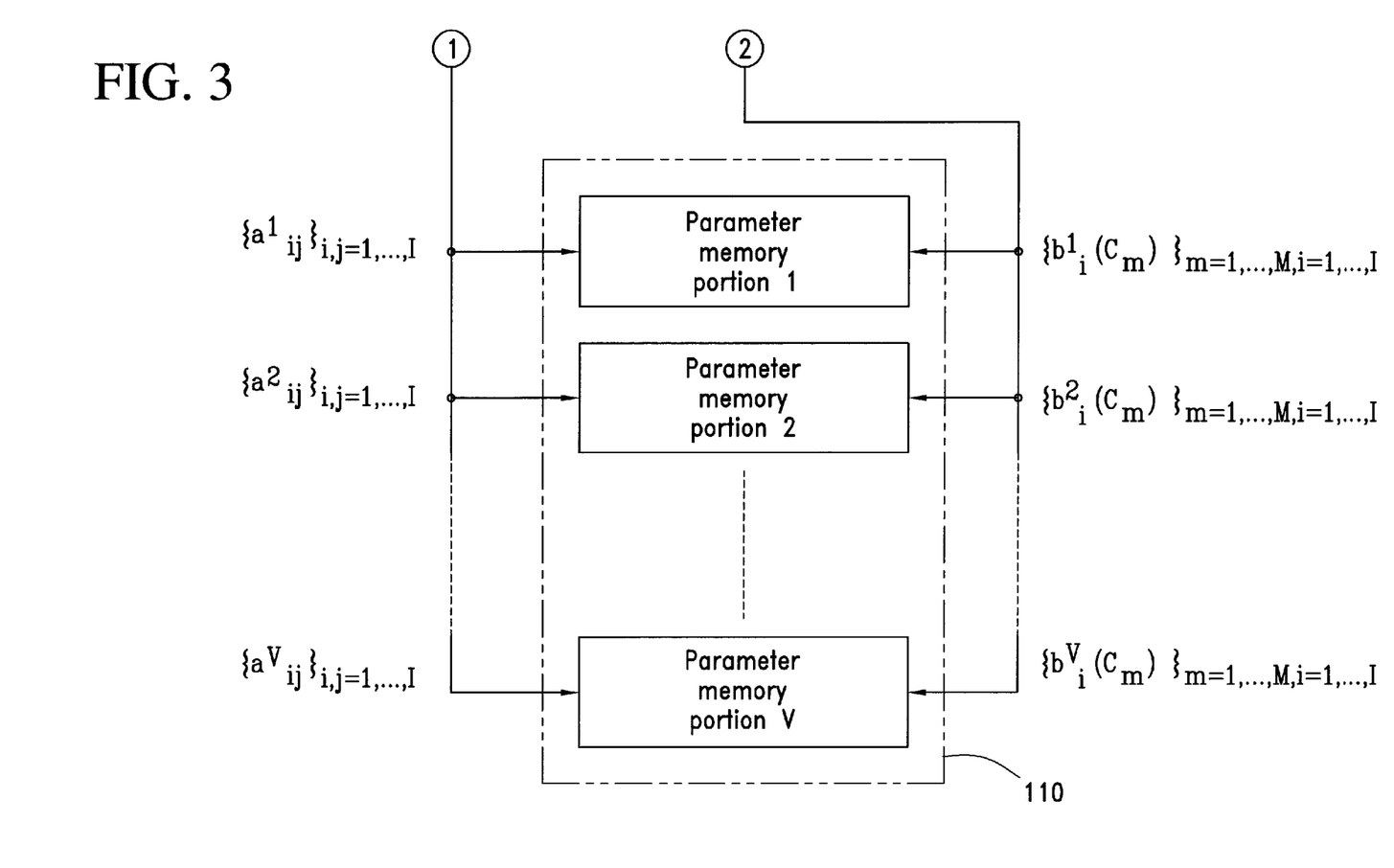
FIG. 3 is the remaining part of the block diagram showing an embodiment of a device for estimating a parameter of HMM according to the present invention.

FIGS. 2 and 3 show an embodiment of an HMM generator of the present invention, and the structure and operation are described.

A feature extracting part 101 converts sound signals of training words r=1~$R_V$ that are prepared for generating a model corresponding to a word v (=1, ..., V) to a series of feature vectors:

[Formula 28]

$$Y^{(r)} = (y^{v(r)}(1), y^{v(r)}(2), \ldots, y^{v(r)}(T^{(r)}))$$

formula 28 by a known method.

A word pattern memory part 102 is a memory means such as a RAM, ROM and various discs, and stores $R^v$ training words for generating a model $\lambda^v$ in the form of the series of feature vectors series.

$$\sum_{v=1}^{U} \sum_{r=1}^{R^v} T^{v(r)}$$ [formula 29]

A clustering part 103 clusters feature vectors of formula 29 in numbers that are stored to cluster in the word pattern memory part 102. Here, a label of the cluster number m is defined as $C_m$, and its centroid as $y_{om}$.

A cluster vector memory part 104 stores respective vectors and centroids of m clusters obtained by the clustering part 103 in a form referenced by m.

A vector quantizing part 105 converts vectors of a feature vector series constituting a training pattern of a word v that is stored in the word pattern memory part 102 to a centroid vector closest thereto by using the centroids in the cluster vector memory part 104. In part 105, an input vector $y^{v(r)}(t)$ is converted to a centroid $z^{v(r)}(t)$.

A buffer memory 106 temporarily stores $R^v$ word patterns in relation to v converted at the vector quantizing part 105.

A parameter estimating part 107 executes the steps (1) to (9) for generation of the model $\lambda^v$, considering that $z^{v(r)}(1)$, $z^{v(r)}(2)$, ———$z^{v(r)}(T^{v(r)})$ is a set of training pattern, and estimates the model $\lambda^v$ corresponding to the word v.

A first parameter memory part 108 primarily stores a re-estimated value of a parameter obtained in step (6). Re-estimation by the parameter estimating part 107 is performed by using values in the parameter memory part 108.

A label incidence calculating part 109 calculates probability densities of vectors $y_m(1)$, ———, $y_m(K^m)$ of the cluster $C_m$ that are stored in the cluster vector memory part 104 for v=1, ..., V, i=1, ..., I, m=1, ..., M from a probability density function of model $\lambda^v$ stored in the parameter memory part 108, and calculates an incidence $b^v_{im}$ of Cm in the state i of HMM of the word v according to the formula 27.

A second parameter memory part 110 is a memory means for storing parameters corresponding to a word v=1~V, and parameters corresponding to the respective word v=1, ..., V are stored in parameter memory portion 1, ..., parameter memory portion V, respectively. In other words, a transition probability corresponding to each state of the respective words is read from the first parameter memory part 108, and stored in a form which is able to be referenced by v, i, j. In addition, a label incidence in each state of the respective words is read from the label incidence calculating part 109, and stored in a form which is able to be referenced by v, i, m.

In such a manner, a discrete probability distribution HMM is generated.

As a result, in the present invention, a continuous probability distribution HMM is firstly generated, a set of vectors forming a set of patterns used in learning was clustered, and an incidence $b_{im}$ of vectors included in a cluster m is obtained in the state i of the HMM by using a probability density obtained as the continuous probability distribution type HMM, and converted to a discrete probability distribution type HMM.

Succeedingly, a method and device for recognizing actual sound inputs is described by using the following model.

Figure 5:
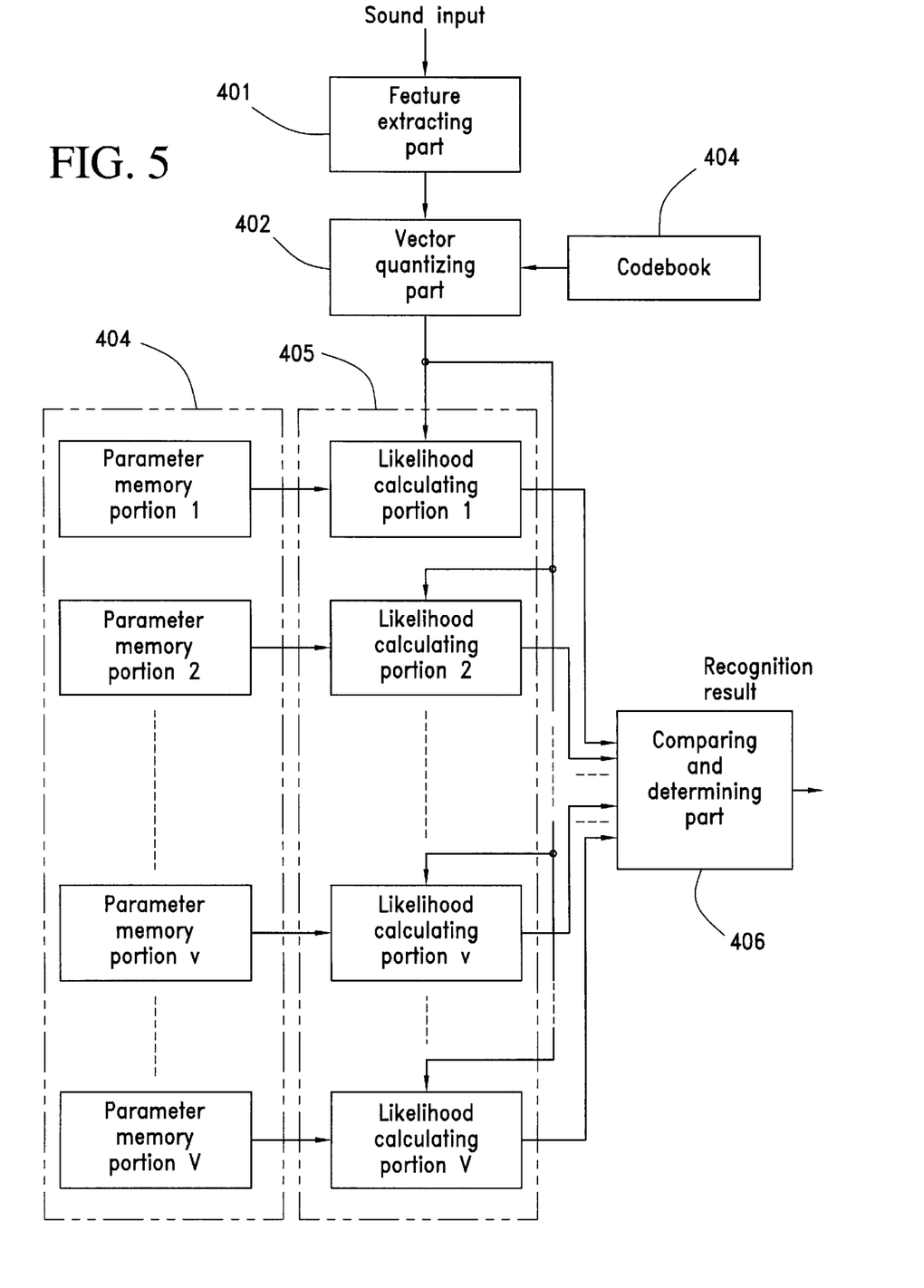
FIG. 5 is a block diagram showing an embodiment of a speech recognizing device using HMM that is constructed according to the present invention.

FIG. 5 is a block diagram of the recognizing device, and the structure and operation are simultaneously described.

A feature extracting part 401 has a structure and function identical to those of the feature extracting part 101 of FIG. 2.

In a codebook 403, centroids of clusters stored in the cluster vector memory part of the HMM generator of FIGS. 2 and 3 are stored.

A vector quantizing part 402 calculates a distance between a feature vector y(t) of an output of the feature extracting part 401 and a representative vector $y_{om}$(m=1, ..., M) of the respective clusters stored in the codebook 403, and converts a feature vector series to a label series by substituting for y(t) a label of cluster corresponding to the respective vector closest to y(t).

A parameter memory part 404 has a structure and function identical to that of the parameter 101 of FIG. 3, and a parameter of a model corresponding to the word v (=1, ..., V) is stored in a parameter memory portion v.

A likelihood calculating part 405 calculates a likelihood of the models to a label series obtained at an output of the vector quantizing part 402 by using the content of the parameter memory part 404. In other words, in a likelihood calculating portion v, the content of the parameter memory portion v is used. For a likelihood calculating method, either formulae 1, 2 or 3 can be used.

A comparing and determining part 406 comparatively determines the maximum output of those of likelihood calculating portions 1, ..., V included in the likelihood calculating part 405, and outputs a word corresponding thereto as a recognition result, thus, executing a calculation corresponding to the formula 4.

A recognition result is obtained from the comparing and determining part 406.

Although an embodiment for recognition of a word has been described above, in the present invention, it is obvious that the word may be replaced by a phone, syllable and the like, and it is also applicable to other patterns in addition to speeches.

Moreover, although a distribution of feature vectors has been described, in the embodiment, as being in accordance with a single normal distribution in each state, it is obvious that the present invention provides a more accurate label incidence by using a so-called mixed distribution.

Furthermore, the present invention is applicable not only to speech recognizing devices, but also to other time series signal processing fields.

In addition, the means of the present invention may be achieved software wise by using a computer, or using dedicated hardware circuits with such functions.

As appreciated from the above description, since the present invention comprises vector quantizing means for quantizing vectors of a training pattern comprising a vector series, and converting the vectors into a label series of clusters to which they belong, continuous distribution probability density HMM generating means for generating a continuous distribution probability density HMM from a quantized vector series corresponding to each label of the label series, and label incidence calculating means for calculating incidence of the labels in each state from the training vectors classified in the same clusters and the continuous distribution probability density HMM, an estimation error due to insufficiency and bias of training data that is a problem, of a discrete type HMM can be eliminated, and a model that makes use of an advantage of the discrete type HMM, that, is, fewer calculations, can be achieved.

What is claimed is:

1. An HMM generator, comprising:
   vector quantizing means for generating a model by quantizing vectors of a training pattern having a vector series, and converting said quantizing vectors into a label series of clusters to which they belong,
   continuous probability distribution density HMM generating means for generating a continuous probability distribution density HMM from a quantized vector series corresponding to each label of said label series of clusters, and
   label incidence calculating means for calculating the incidence of the labels in each state from said quantizing vectors of a training pattern classified in the same label series of clusters and the continuous probability distribution density HMM.

2. An HMM memory device, comprising:
   state transition probability memory means for storing a state transition probability obtained by the HMM (Hidden Markov Model) generator according to claim 1, and
   label incidence calculating memory means for storing a label incidence in each state.

3. A likelihood calculating device, comprising:
   the vector quantizing means according to claim 1 for converting the quantized vector series to label series of clusters by substituting labels for vectors of a feature vector series that constitute an input pattern for the vector quantizing means, and
   likelihood calculating means for calculating, from a state transition probability and label incidence stored in an HMM memory device, the likelihood of HMM described by parameters stored in the HMM memory device to the input pattern, said HMM memory device comprising an HMM generator having vector quantizing means for generating a model by quantizing vectors of a training pattern having a vector series, and converting said quantizing vectors into a label series of clusters to which they belong, continuous probability distribution density HMM generating means for generating a continuous probability distribution density HMM from a quantized vector series corresponding to each label of said label series of clusters, and label incidence calculating means for calculating the incidence of the labels in each state from said quantizing vectors of a training pattern classified in the same label series of clusters and the continuous probability distribution density HMM.

4. A recognizing device comprising the likelihood calculating device according to claim 3 for each recognition unit, wherein:
   the likelihood of the recognition models to the input signals is calculated, and the recognition unit to which the input signal corresponds, is determined from the likelihood.

5. An HMM (Hidden Markov Model) generator according to claim 1, wherein
   the label incidence calculating means provides a probability density of quantized vectors corresponding to the clusters from a probability density function of the continuous probability distribution density HMM in state i, and recognizes the probability density as incidence $b_{im}$ of $C_m$ in the state i, where $C_m$ (m=1, ... M) is the cluster.

6. An HMM generator according to claim 5, wherein the label incidence calculating means includes a incidence normalizing means further calculating $b_{im}=b_{im}/(b_{i1}+ \text{———} + b_{iM})$ from the $b_{im}$ and recognizes the normalized incidence $b_{im}$ as incidence of $C_m$ in the state i.

7. An HMM generator according to claim 5, wherein the label incidence calculating means includes a incidence normalizing means further calculating $b_{im}=b_{im}/(b_{i1}+ \text{———} + b_{iM})$ from the $b_{im}$ and recognizes the normalized incidence $b_{im}$ as incidence of $C_m$ in the state i.

8. An HMM generator according to claim 1, wherein
   the label incidence calculating means calculates a probability distribution density of said quantizing vectors of a training pattern including a $c_m$ from a probability distribution density function of the continuous probability distribution density HMM in state i, includes characteristic values such as the mean and median of the probability distribution density, and recognizes a characteristic value as an incidence $b_{im}$ of $c_m$ in the state i, where $c_m$ (m=1, ... M) is the cluster.

9. An HMM generator, comprising:
   word pattern memory means for storing a training pattern and generating a series of feature vectors;
   vector quantizing means connected to said word pattern memory means for quantizing vectors of a training pattern received from said word pattern memory means and converting said quantizing vectors into a label series of clusters to which they belong;
   buffer memory means connected to said vector quantizing means for temporarily storing training word patterns of a word converted at said vector quantizing means;
   parameter estimating means connected to said buffer memory means for generating a model corresponding to said word converted at said vector quantizing means;
   parameter memory means connected to said parameter estimating means for storing re-estimated values of at least a transition probability for various states; and
   label incidence calculating means connected to said parameter memory means for calculating the incidence of the labels in each state from said quantizing vectors of a training pattern classified in the same label series of clusters and the continuous probability distribution density HMM.

10. The HMM generator according to claim 9, wherein said parameter memory means includes a first parameter memory part and a second parameter memory part connected to said first parameter memory part and said label incidence calculating means.

11. The HMM generator according to claim 10, wherein said second parameter memory part includes a plurality of parameter memory portions for storing parameters corresponding to a respective word.

12. The HMM generator according to claim 11, further comprising:
    clustering part means connected to said word pattern memory means for clustering said feature vectors as cluster members and generating a label of cluster members and its centroid.

13. The HMM generator according to claim 12, further comprising:
    cluster vector memory means connected to said clustering part means, said vector quantizing means and said label incidence calculating means for storing respective vectors and centroids of cluster generated in said clustering part means.

* * * * *

UNITED STATES PATENT AND TRADEMARK OFFICE
CERTIFICATE OF CORRECTION

PATENT NO.     : 6,434,522 B1
DATED          : August 13, 2002
INVENTOR(S)    : Eiichi Tsuboka It is certified that error appears in the above-identified patent and that said Letters Patent is hereby corrected as shown below:

<u>Title page,</u>
Item [56], U.S. PATENT DOCUMENTS, the inventor's name of U.S. Patent No. 5,129,002 should be -- Tsuboka --.

<u>Column 13,</u>
Line 5, -- (Hidden Markov Model) -- should be inserted between "HMM" and "generator".
Line 20, -- (Hidden Markov Model) -- should be inserted between "HMM" and "memory";
Line 23, "(Hidden Markov Model)" should be deleted.

<u>Column 14,</u>
Line 1, -- (Hidden Markov Model) -- should be inserted between "HMM" and "generator".

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,434,522 B1
DATED         : August 13, 2002
INVENTOR(S)   : Eiichi Tsuboka It is certified that error appears in the above-identified patent and that said Letters Patent is hereby corrected as shown below:

<u>Title page,</u>
Item [73], add:
-- [73] Matsushita Electric Industrial Co., Ltd., Osaka (JP) --

Signed and Sealed this

Twenty-fourth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,434,522 B1  
APPLICATION NO. : 08/864460  
DATED : August 13, 2002  
INVENTOR(S) : Tsuboka

It is certified that error appears in the above-identified patent and that said Letters Patent is hereby corrected as shown below:

On the Title page:

Item [*] Notice should read -- Subject to any disclaimer, the term of this patent is extended or adjusted under 35 U.S.C. 154(b) by 1202 days--.

Signed and Sealed this

Sixth Day of February, 2007

JON W. DUDAS  
*Director of the United States Patent and Trademark Office*